US012339042B2

(12) United States Patent
Toews et al.

(10) Patent No.: US 12,339,042 B2
(45) Date of Patent: Jun. 24, 2025

(54) METHOD FOR CONFIGURING WELLBORES IN A GEOLOGIC FORMATION

(71) Applicant: EAVOR TECHNOLOGIES INC., Calgary (CA)

(72) Inventors: Matthew Toews, Calgary (CA); Paul Cairns, Calgary (CA); Derek Riddell, Calgary (CA); Andrew Curtis-Smith, Calgary (CA); Jonathan Hale, Calgary (CA)

(73) Assignee: Eavor Technologies Inc.

( * ) Notice: Subject to any disclaimer, the term of this patent is extended or adjusted under 35 U.S.C. 154(b) by 0 days.

(21) Appl. No.: 18/521,672

(22) Filed: Nov. 28, 2023

(65) Prior Publication Data
US 2024/0110731 A1 Apr. 4, 2024

Related U.S. Application Data

(62) Division of application No. 16/929,284, filed on Jul. 15, 2020, now Pat. No. 11,852,384.

(30) Foreign Application Priority Data

Jul. 6, 2020 (CA) .................. CA 3085901

(51) Int. Cl.
F24T 10/20 (2018.01)
E21B 7/04 (2006.01)
(Continued)

(52) U.S. Cl.
CPC ................ *F24T 10/20* (2018.05); *E21B 7/04* (2013.01); *E21B 33/138* (2013.01);
(Continued)

(58) Field of Classification Search
CPC ...... E21B 47/0228; E21B 7/04; E21B 33/138; E21B 36/001; E21B 43/305; F24T 10/20; Y02E 10/10
See application file for complete search history.

(56) References Cited

U.S. PATENT DOCUMENTS 4,016,942 A 4/1977 Wallis et al.
4,223,729 A * 9/1980 Foster .................. E21B 43/17
166/250.1

(Continued)

FOREIGN PATENT DOCUMENTS

CA 2898244 5/2006
CA 2795659 5/2013
(Continued)

OTHER PUBLICATIONS

Extended European Search Report in European Appln. No. 20945101, mailed on Feb. 14, 2024, 17 pages.
(Continued)

Primary Examiner — Jennifer H Gay
(74) Attorney, Agent, or Firm — Fish & Richardson P.C.

(57) ABSTRACT

Closed loop wellbore configurations with unrestricted geometry for accommodating irregular or challenging thermal gradients within a thermally productive formation are disclosed. A working fluid is utilized in the loop for extraction of thermal energy there from. The loop and the unrestricted geometry are achieved using magnetic ranging of independent drilling operations which intersect from an inlet well and outlet well to form an interconnecting segment. In conjunction with the directional drilling, conditioning operations are incorporated to condition the rock face, cool the entire system, activate the wellbore for treatment to optimize thermal transfer inter alia. The significant degree of freedom in wellbore configuration is further optimized by the absence (Continued)

of mechanical impediments such as casing or liners in the heat transfer areas.

18 Claims, 13 Drawing Sheets

(51) Int. Cl.
    *E21B 33/138*    (2006.01)
    *E21B 36/00*    (2006.01)
    *E21B 43/30*    (2006.01)
    *E21B 47/0228*    (2012.01)

(52) U.S. Cl.
    CPC .......... *E21B 36/001* (2013.01); *E21B 43/305* (2013.01); *E21B 47/0228* (2020.05)

(56) References Cited

U.S. PATENT DOCUMENTS

| | | | |
|---|---|---|---|
| 5,258,755 A | 11/1993 | Kuckes | |
| 5,515,679 A * | 5/1996 | Shulman | F03G 7/04 165/45 |
| 6,000,471 A * | 12/1999 | Langset | F24T 10/30 166/268 |
| 6,247,313 B1 * | 6/2001 | Moe | E21B 43/305 60/641.5 |
| 6,301,894 B1 * | 10/2001 | Halff | F03G 7/04 60/641.1 |
| 6,668,554 B1 | 12/2003 | Brown | |
| 7,493,951 B1 * | 2/2009 | Kravits | E21B 43/006 166/50 |
| 8,376,039 B2 | 2/2013 | Zupanick | |
| 9,033,039 B2 * | 5/2015 | Stalder | E21B 43/2406 166/272.3 |
| 9,109,398 B2 * | 8/2015 | Harris | E21B 43/30 |
| 9,303,500 B2 * | 4/2016 | Schneider | E21B 43/243 |
| 9,581,718 B2 | 2/2017 | Rodney | |
| 10,260,778 B2 | 4/2019 | Sonju et al. | |
| 10,294,773 B2 * | 5/2019 | Donderici | E21B 47/024 |
| 10,435,994 B2 | 10/2019 | Colvin et al. | |
| 10,527,026 B2 * | 1/2020 | Muir | F24T 10/10 |
| 10,927,604 B2 * | 2/2021 | Danko | E21B 33/138 |
| 10,954,924 B2 * | 3/2021 | Moncarz | E21B 43/305 |
| 11,125,472 B2 * | 9/2021 | Toews | F24T 10/15 |
| 11,156,386 B2 * | 10/2021 | Cairns | F24T 10/13 |
| 11,852,384 B2 * | 12/2023 | Toews | E21B 47/0228 |
| 2005/0241834 A1 * | 11/2005 | McGlothen | E21B 41/0035 166/241.1 |
| 2006/0124360 A1 | 6/2006 | Lee et al. | |
| 2007/0245729 A1 * | 10/2007 | Mickleson | F01K 23/02 60/641.2 |
| 2009/0255661 A1 | 10/2009 | Clark et al. | |
| 2011/0048005 A1 * | 3/2011 | McHargue | F24T 10/10 165/45 |
| 2012/0080163 A1 * | 4/2012 | Hoffman | E21B 7/04 165/45 |
| 2012/0174581 A1 * | 7/2012 | Vaughan | F24T 10/10 290/40 C |
| 2013/0118737 A1 * | 5/2013 | Schneider | E21B 43/2405 166/272.3 |
| 2015/0285226 A1 * | 10/2015 | Archambeau | F03G 7/04 60/641.1 |
| 2016/0273345 A1 * | 9/2016 | Donderici | E21B 7/10 |
| 2017/0058181 A1 * | 3/2017 | Frantz | F24T 10/10 |
| 2017/0122099 A1 | 5/2017 | Yao et al. | |
| 2017/0130703 A1 * | 5/2017 | Muir | F24T 10/10 |
| 2017/0211849 A1 * | 7/2017 | Muir | F24T 10/15 |
| 2018/0274524 A1 * | 9/2018 | Moncarz | F24T 10/13 |
| 2018/0313203 A1 | 11/2018 | Donderici et al. | |
| 2019/0055930 A1 * | 2/2019 | Muir | F03G 7/04 |
| 2019/0128068 A1 * | 5/2019 | Danko | E21B 47/022 |
| 2019/0154010 A1 * | 5/2019 | Toews | F01K 25/08 |
| 2020/0011151 A1 * | 1/2020 | Toews | E21B 43/305 |
| 2020/0408041 A1 * | 12/2020 | Riddell | F24T 10/00 |
| 2021/0003320 A1 * | 1/2021 | Toews | E21B 43/305 |
| 2021/0325089 A1 * | 10/2021 | Toews | F24T 10/10 |
| 2022/0003459 A1 * | 1/2022 | Toews | E21B 36/001 |
| 2024/0110731 A1 * | 4/2024 | Toews | E21B 7/04 |

FOREIGN PATENT DOCUMENTS

| | | |
|---|---|---|
| CA | 3041002 | 5/2019 |
| CA | 3044153 | 1/2020 |
| CA | 3083568 | 12/2020 |
| CA | 3085901 | 2/2021 |
| CN | 106246101 | 12/2016 |
| JP | 2018-537620 | 12/2018 |
| JP | 2019-513211 | 5/2019 |
| JP | 2020-007902 | 1/2020 |
| KR | 20180013355 | 2/2018 |
| WO | WO 2006/053434 A1 | 5/2006 |
| WO | WO 2015030601 | 3/2015 |
| WO | WO 2015134974 | 9/2015 |
| WO | WO 2017053884 | 3/2017 |
| WO | WO 2017146712 | 8/2017 |
| WO | WO 2020006620 | 1/2020 |
| WO | WO 2020257913 | 12/2020 |
| WO | WO 2022018674 | 1/2022 |
| WO | WO 2022043947 | 3/2022 |

OTHER PUBLICATIONS

Final Office Action issued in U.S. Appl. No. 16/929,284 on Jun. 10, 2022, 18 pages.
International Search Report and Written Opinion in International Appln. No. PCT/CA2020/000088, dated Mar. 31, 2021, 12 pages.
Non-Final Office Action issued in U.S. Appl. No. 16/929,284 on Nov. 4, 2022, 22 pages.
Office Action in Canadian Appln. No. 3,085,091, dated Sep. 6, 2022, 4 pages.
Office Action in Canadian Appln. No. 3,085,091, dated Sep. 7, 2021, 3 pages.
Supplementary European Search Report in European Appln. No. 20945101.2, mailed on Apr. 30, 2024, 14 pages.
Office Action in Japanese Appln. No. 2023-503005, mailed on Jul. 16, 2024, 6 pages (with English translation).
Office Action in New Zealand Appln. No. 796243, mailed on Jul. 30, 2024, 4 pages.
Office Action in Indian Appln. No. 202327004124, mailed on Dec. 20, 2024, 7 pages.

* cited by examiner

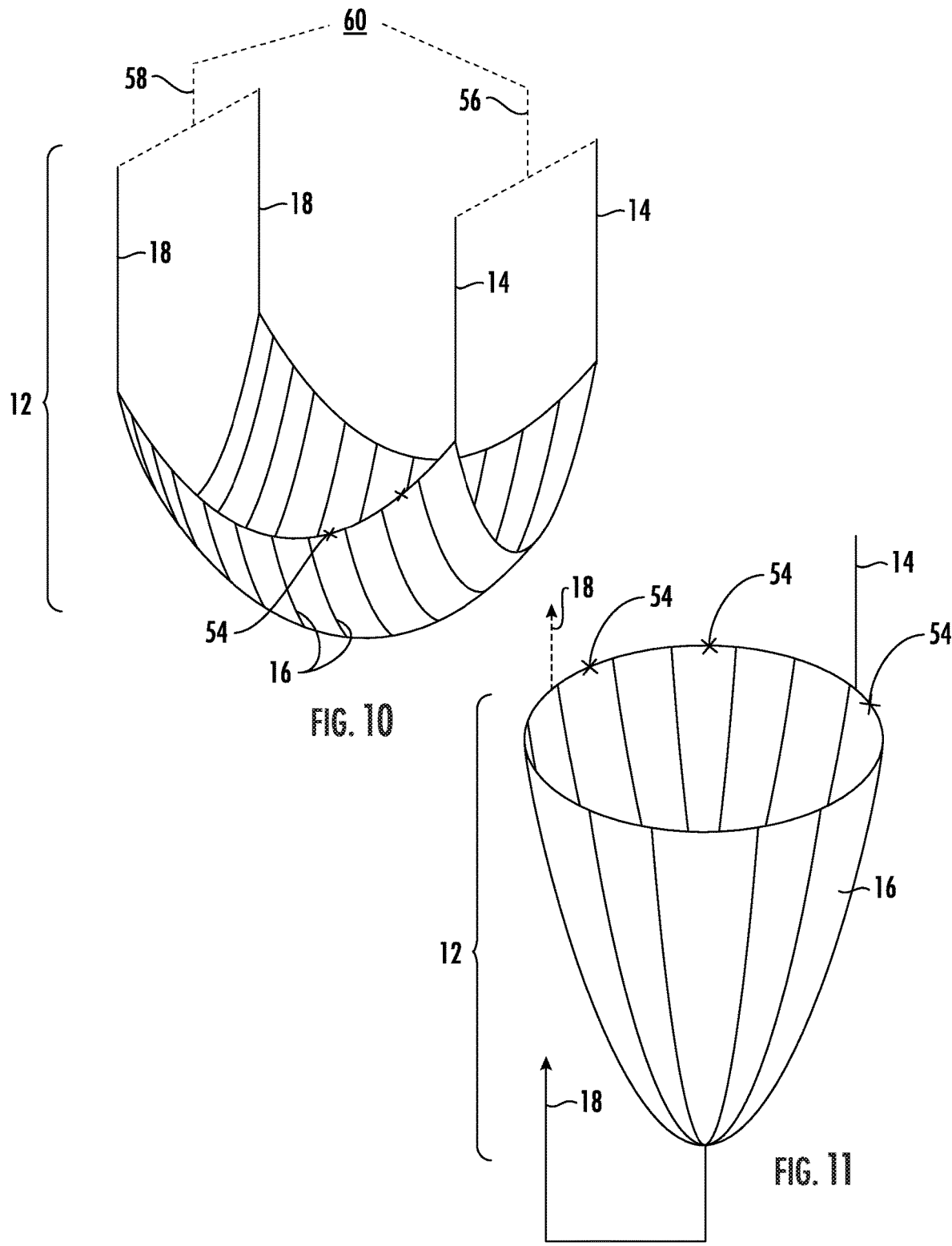

METHOD FOR CONFIGURING WELLBORES IN A GEOLOGIC FORMATION

CROSS-REFERENCE TO RELATED APPLICATIONS

This application is a divisional of U.S. Pat. No. 16,929,284, filed Jul. 15, 2020, which claims the benefit of priority under 35 U.S.C. § 119 to Canadian Application No. 3,085,901, filed on Jul. 6, 2020, the contents of which are hereby incorporated by reference.

FIELD OF THE INVENTION

The present invention relates to configuring wells within a thermally productive geologic formation and more particularly, the present invention relates to optimizing drilling in a formation to facilitate well positioning to maximize recovery of thermal energy from a specific formation thermal gradient.

BACKGROUND OF THE INVENTION

With the advent of improved drilling techniques for drilling to greater depths in a formation and higher toleration of temperatures, numerous advances have been made to allow for the formation of specific well configurations.

To elevate the efficiency of well positioning the unification of drilling techniques, working fluid chemistry, wellbore conditioning unit operations together with flow rate, sequencing inter alia must be combined to achieve efficient heat recovery in the most complex and varied thermal gradients in a given formation.

The present invention facilitates the ability to recover thermal energy regardless of thermal gradient anomalies and complexities.

In terms of the evolution of the art, one of the earlier developments is realized in Moe, U.S. Pat. No. 6,247,313, issued Jun. 19, 2001. There is disclosure regarding a wellbore configuration which includes a plurality of heat absorbing holes within a geothermal area. The disclosure is silent regarding casing or liners, however it is limited to utilization of a fractured zone, angular disposition of the heat absorbing holes being parallel to each other and further limitations. The teachings specifically state:

"The magnitude of the sloping angle will depend on several factors, for instance the temperature gradient in the rock, the length of the heat absorbing hole and the water flow rate. Calculating the angle will be well within the capabilities of the skilled person and will therefore not be detailed here. The angle would normally lie between 20° and 50°, preferably it will be about 40°.

Furthermore, in order to maximize the extraction of heat from a given volume of rock, at least substantial parts of the heat absorbing holes extend parallel to each other. More preferably, the heat absorbing holes are arranged in one layer or, if necessary, in a plurality of vertically spaced layers. Providing an array of vertically spaced layers, each layer having a plurality of heat absorbing holes, allows for increasing the capacity of the plant without spreading the holes over a wide area. This is of considerable importance if the volume of earth available for exploitation is not large.

The supply and return holes 3, 4 are interconnected by four heat absorbing holes 5, each having a diameter of 10 cm and being approximately 2000 m long. The spacing between these holes 5 may be 100-150 m. They have been drilled starting out from the supply hole 3 and terminate at or near the return hole 4. A fracture zone 6 has been established in this area to provide flow communication between the holes 4 and 5 since it would be difficult to hit the return hole 4 directly when drilling the heat absorbing holes 5."

The teachings also teach a difficulty regarding the connection of the inlet and outlet as emphasized.

As a disadvantage, the Moe arrangement would not provide sufficient teaching regarding unrestricted access to a gradient regardless of its anomalies and thus the disclosure is limited to specific scenarios.

In U.S. Pat. No. 5,515,679, issued May 14, 1996, Shulman. The document teaches a closed loop thermal energy recovery arrangement in a variety of rock types at higher temperatures, one of which is solid rock which is differentiated in the disclosure of Shulman:

"This invention relates to novel methods and apparatus employing liquid circulation in a closed pipe loop system by which the thermal energy in subterranean hot rock is extracted, i.e. mined, and brought to the surface for utilization. Said hot rock may be solid, fissured or fractured and dry or wet but essentially free of mobile fluid. By this invention, the thermal energy is transferred from the hot rock to relatively cold liquid flowing in one or more of a plurality of distantly separated heat conducting pipe loops that descend from a manifold at the surface into the hot rock and then join together with the bottom of a riser through which the heated fluid returns to the surface."

The wellbore configurations are not discussed in any details with complex patterns or disposition of the heat recovering conduits. The arrangement relies on piping in the wellbore configuration for fluid transportation through the arrangement for thermal recovery from the formation. Another disadvantage is seen by the positioning of the manifold on the surface rather than inherently within a downhole network of wellbores.

Brown, in U.S. Pat. No. 6,668,554, issued Dec. 30, 2003, teaches a fracturing process for forming a fractured zone in hot dry rock. Super critical CO2 is used as a working fluid to convey the absorbed energy from the geothermal formation. The fluid communication is not in a closed loop where there is an interconnecting segment in fluid communication between an inlet well and an outlet well where the working fluid is isolated from the formation. In the Brown arrangement, the formation itself indiscriminately communicates with the inlet and outlet wells. This is further evinced by the fact that Brown teaches:

"Finally, the hot dry rock circulating system is completed by drilling the two or more production wells to intersect the reservoir near each end of the elongated reservoir region as defined by the "cloud" of microseismic event locations defining the shape of the fractured hot dry rock reservoir. All the wells would be appropriately completed with casing to the surface and then purged of drilling fluids and other water-based materials, again using gaseous carbon dioxide."

From this passage the use of casing is identified as is an intersection of wells, but not with each other as in a closed loop, but rather with a man-made reservoir within the formation.

U.S. Pat. No. 10,260,778, Sonju, issued Apr. 16, 2019 discloses a geothermal plant. There are teachings in the patent regarding specific requirements for the production sections of the configuration being in a specific disposition relative to a concentric inlet/outlet well arrangement. The disclosure does not provide instruction regarding conditioning of the wellbores during or after drilling or possible directions for interconnecting segments to exploit the thermally productive zone without restriction.

Muir et al, in U.S. Pat. No. 10,527,026, issued Jan. 7, 2020, teach a closed loop heat recovery arrangement for transferring heat from a well casing into the fluid. The text indicates:

"Embodiments disclosed herein are directed towards methods and apparatus for the production of power from a non-permeable geological resource, through the use of a closed loop design, where the fluid is fully isolated from the formation in a closed loop well and heat is transferred through the well casing into the fluid."

"As described in the background section above, typical hydrothermal systems, as well as closed loop systems, have been focused on extracting heat from permeable geological resources where fractures or porosity occur either naturally or through stimulation. In contrast, embodiments disclosed herein may efficiently and effectively extract heat from low-permeability rock, such as rock in the plastic zone. Geologic formations including higher temperature low-permeable rock are advantageously used by passing a fluid through the resource without direct contact between the fluid and the rock, whereby heat is transferred directly from the rock through the well casing into the fluid."

"A closed loop geothermal heat exchange system may then be disposed within the subterranean formation based on the determined temperature profile and the determined heat replenishment profile of the subterranean formation. Emplacement of the closed loop geothermal heat exchange system may include drilling, casing, perforating, cementing, expanding uncased well walls with fractures, sealing uncased well walls and other steps associated with a drilling process and emplacement of a well loop therein as known to one skilled in the art. The emplacing may include, in some embodiments, disposing a heat exchange zone of the closed loop well system within a plastic zone or a brittle-ductile transition zone of the formation. In some embodiments, the emplacing may include or additionally include disposing a heat exchange zone of the closed loop well system within a brittle zone of the formation, as well as stimulating the brittle zone proximate the heat exchange zone."

The text provides a general teaching regarding sealing, but includes casing in the heat recovering sections of the wellbore configuration. The text indicates:

"According to some embodiments, methods for producing geothermal energy described herein may include portions of wells that are not cased with metal pipe but, instead, the walls of such portions may be formation rock that has been sealed with hardened sealant and the well wall in such portions being defined by the boundary of such hardened sealant which, in some embodiments, will cause the diameter of the well in such portions to be larger, and in some cases much larger, than in the metal cased portion of such wells."

The reference mirrors the teachings of Shulman, supra, and does not provide instruction regarding intersection of wells, the absence of casing and/or liners or geometric variation in the disposition of the heat recovering segments of the wellbore arrangement to accommodate any thermal gradient pattern.

It would be desirable to have a method of forming a wellbore configuration that can be user adapted to the anomalies of the gradient pattern as opposed to being confined to specific wellbore designs that are adapted to the limitations of the existing equipment and methods for recovering thermal energy.

The present inventive methods disclosed herein after ameliorate the noted limitations and provide previously unseen degrees of freedom to efficiently capture thermal energy from within a thermally productive formation.

SUMMARY OF THE INVENTION

One object of one embodiment of the present invention is to provide an improved method for configuring wells and well systems in a thermally productive formation for recovery of thermal energy there from for subsequent use.

Another object of one embodiment of the present invention is to provide a method for configuring wellbores in a thermally productive geologic formation, comprising:
    drilling independently in said formation a well having an inlet well and an outlet well;
    signalling between said inlet well and said outlet well during drilling to intersect to form a continuous well having an interconnecting segment between said inlet well and said outlet well, said interconnecting segment having a predetermined angular configuration relative to said inlet well and said outlet well within said formation;
    conditioning at least said interconnecting segment to facilitate thermal recovery by working fluid flow therethrough without casing or liner material in said interconnecting segment.

The conditioning is effected by at least one of continuously, discontinuously, during, after and in sequenced combinations of drilling of at least one of drilling the inlet well and the outlet well.

In greater detail, conditioning may include introducing at least one composition not native to the formation and a unit operation and combinations thereof.

To augment the effectiveness of the method, one may dynamically modify the conditioning operations responsive to signalling data from at least one of the drilling operations of the inlet and outlet wells.

Depending on the specific situation the unit operation may include controlling the temperature of drilling fluid, pre-cooling a rock face in the formation being drilled, cooling drilling apparatus and modifying pore space of wellbores formed from drilling in the formation.

Modification of the pore space may include activating the pore space for subsequent treatment to render it impermeable to formation fluid ingress into the interconnecting segment or egress of the working fluid into the formation, sealing the pore space during drilling in a continuous operation, sealing pore space during drilling in a discontinuous operation and combinations thereof.

Operational conditioning modification may also be based on signalling data from signalling between the inlet well and the outlet well.

Optionally, another unit operation includes forming conduits in the formation relative to a longitudinal axis of an interconnecting segment and in fluid communication therewith for augmenting thermal recovery with the working fluid. The conduits may have a terminal end and positioning of the conduits of an interconnecting segment may be in thermal contact with the adjacent conduits of an adjacent interconnecting segment of another well. The conduits may contain natural buoyancy-driven convection which enhances the effective radius of the heat-collecting interconnecting segment and increases overall heat transfer from the rock volume.

The conduits may be fractures, single bores, auxiliary segments, or multiple radial bores extending radially from an interconnecting segment.

When arranged with a vertical component the conduits act as convection cells, where natural buoyancy-driven convection enhances the effective radius of the heat-collecting interconnecting segment. The conduits are typically 0.5 inches (12.7 mm) in diameter or greater, and may be 8.5 inches (215.9 mm) or equal to the diameter of the interconnecting segment itself.

As another option, conduits of an interconnecting segment may be connected for fluid communication with the adjacent conduits of an adjacent interconnecting segment of another well.

A further object of one embodiment of the present invention is to provide a well configuration suitable for recovering thermal energy from a thermally productive geologic formation through circulation of fluid there through, comprising:

an inlet well;
an outlet well;
an interconnecting segment in fluid communication with said inlet well and said outlet well and disposed within a thermally productive area of said formation;
a selectively operable auxiliary segment in selective fluid circulation communication with said interconnecting segment for storing heated fluid;
a detritus segment in fluid communication with at least one of said inlet well, said outlet well and said interconnecting segment for collecting well detritus;
said outlet well being at least one of concentric with said inlet well and between 5° and 175° relative to said inlet well, the interconnecting segment being between 5° and 355° relative to said inlet well; and
a conversion device connected with the wells to form a closed loop and collect recovered thermal energy from said fluid for conversion.

In one embodiment, the auxiliary segment includes a selectively operable valve for allowing stored heated fluid circulation access to the interconnecting segment and may further include a selectively operable outlet in fluid communication with at least one of the conversion device and an adjacent well configuration.

The configurations may be a plurality of well configurations in a concentric and spaced relation, a plurality of well configurations in a spaced laterally offset parallel planar relation and may further include at least one of a common inlet well and a common outlet well.

For the thermal energy collection, the interconnecting segments are utilized and the configurations can provide a plurality of interconnecting segments in fluid communication with the inlet well and the outlet well with a plurality of spaced apart arrays of interconnecting segments in a predetermined pattern.

A still further object of one embodiment of the present invention is to provide a method of forming a well configuration suitable for recovering thermal energy from a thermally productive geologic formation through circulation of fluid there through, comprising:

independently drilling an inlet well and an outlet well in a predetermined location in the formation;
intersecting drilling from the inlet well and the outlet well to form an interconnecting segment between the inlet well and the outlet well in a predetermined thermally productive area of the formation position in the formation, the outlet well being at least one of concentric with said inlet well and between 5° and 175° relative to said inlet well, said interconnecting segment being between 5° and 355° relative to said inlet well;
forming a selectively operable auxiliary segment in selective fluid circulation communication with said interconnecting segment for storing heated fluid;
forming a detritus segment in fluid communication with at least one of said inlet well, said outlet well and said interconnecting segment for collecting well detritus; and
providing a conversion device connected with the wells to form a closed loop and collect recovered thermal energy from said fluid for conversion.

For the intersection drilling, drilling independently from the inlet well and the outlet well to form an interconnecting segment between the inlet well and the outlet is conducted by electromagnetic signalling.

Electromagnetic signalling devices will be utilized for the signalling and will be selectively positioned in predetermined location combinations of the inlet well, the outlet well, the detritus segment and the interconnecting segment.

The devices may be operated in a predetermined sequence.

Further, the method includes signalling a well in progress with signalling from a previously formed adjacent well.

The method is well suited to recovery of thermal energy from a geothermal formation having a temperature of not less than 40° C.

For efficiency and flexibility of deployment in a formation, circulation of fluid within the interconnecting segment may be performed in the absence of casing and liners.

A plurality of interconnecting segments in embodiments can be in fluid communication with the inlet well and the outlet well, with the configuration having a plurality of spaced apart arrays of interconnecting segments in a predetermined pattern.

Optionally there may be a step of selectively circulating the fluid from one array as a slipstream to an inlet point of a spaced second array prior to discharge at the outlet well common to all arrays. In this way, the slipstream preheats fluid from the inlet well prior to circulation in the spaced second array.

The slipstream may also be distributed to an adjacent well configuration for thermal augmentation of the adjacent well.

Having thus generally described the invention, reference will now be made to the, accompanying drawings, illustrating preferred embodiments.

BRIEF DESCRIPTION OF THE DRAWINGS

FIG. 10 is a further alternate embodiment of a wellbore configuration;

FIG. 11 is a further alternate embodiment of a wellbore configuration;

Similar numerals used in the Figures denote similar elements.

DETAILED DESCRIPTION OF THE PREFERRED EMBODIMENTS

Figure 1:
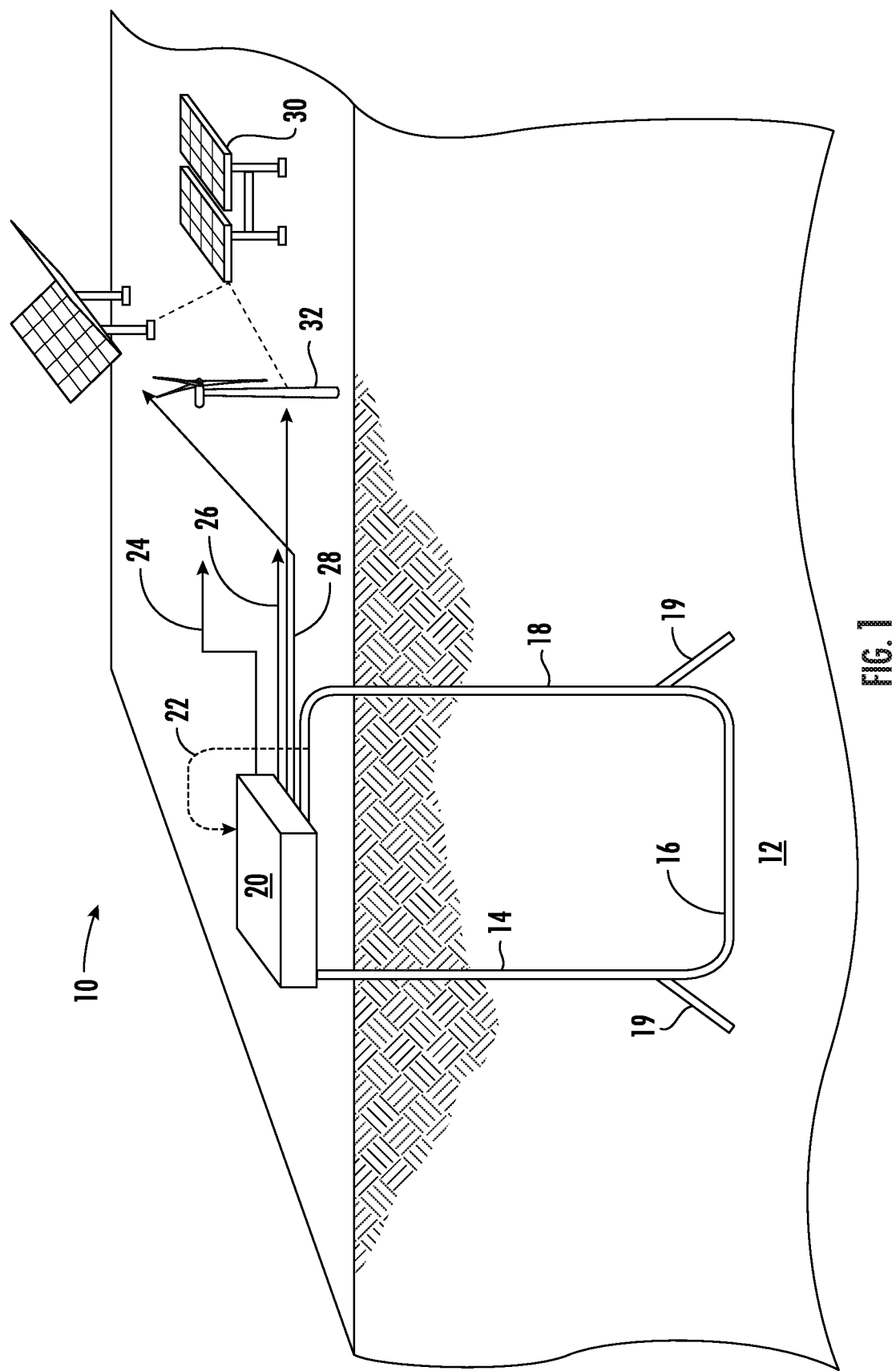
FIG. 1 is a schematic illustration of a closed loop energy recovery arrangement.

Referring to FIG. 1, shown is a schematic representation of a closed loop well system 10 disposed within a thermally productive formation 12. The system 10 includes an inlet well 14, an interconnecting well segment 16 and an outlet well 18 in closed loop fluid communication with an energy processing device 20 positioned on the surface, S. The outlet well may be co-located with the inlet well at the device 20 or located distally as shown by the dashed line 22 for alternate connection. A working fluid is circulated through the system 10 in order to absorb thermal energy from within the formation 12.

For efficiency, the interconnecting well segment 16 is not cased or lined and does not include any other pipe or related mechanical arrangements. The outlet well 18 and inlet well 16 may be cased or otherwise made to comply with accepted practices known to those skilled in the art Any detritus that evolves from use of the arrangement may be collected in segments 19.

Energy processing device 20 may process the energy for other uses broadly denoted by numeral 24, stored at 26 or passed on to an electrical grid 28 which optionally may include solar devices 30 and/or wind devices 32 in any suitable combination.

Figure 2:
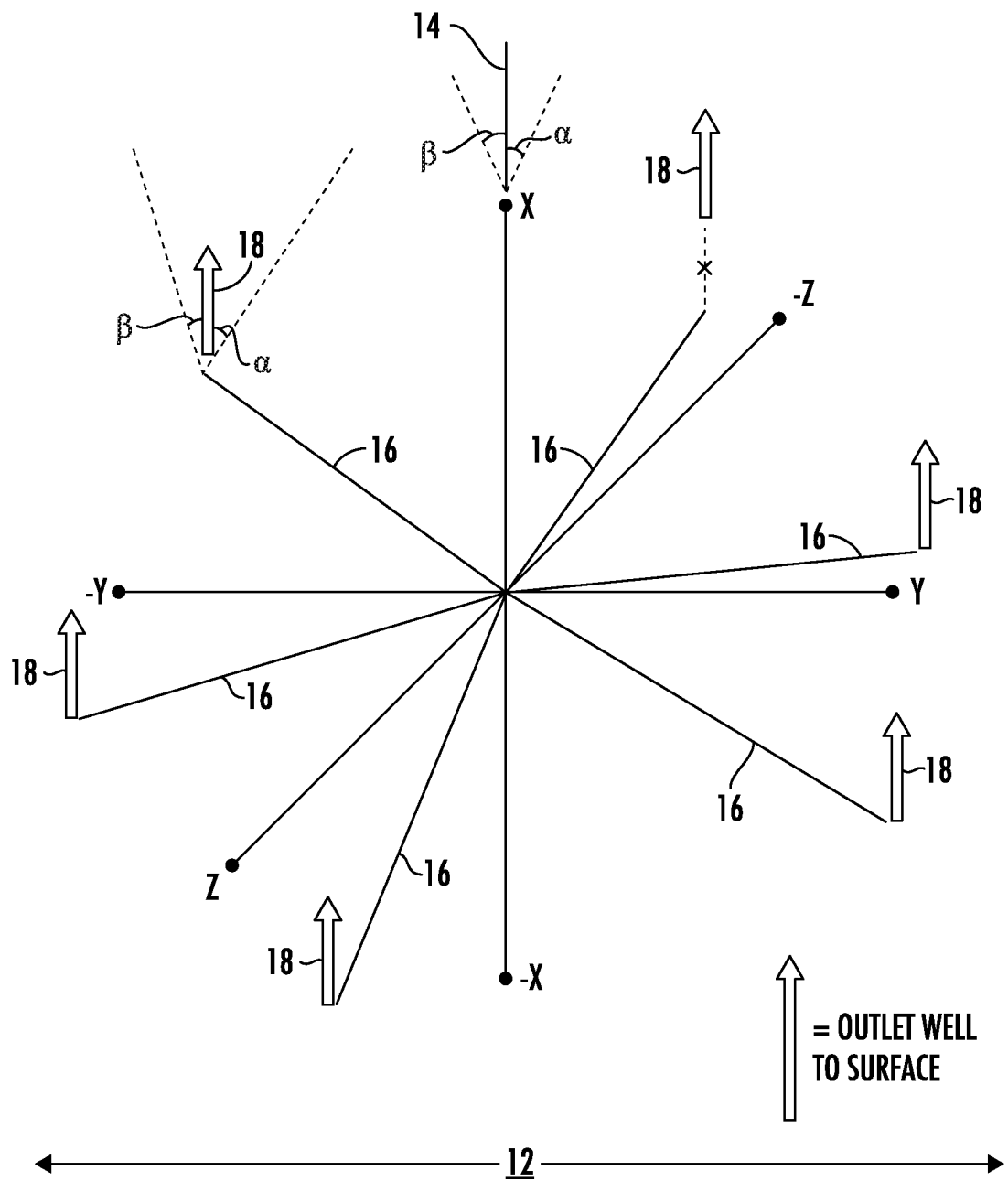
FIG. 2 is a coordinate system illustrating the possible positions of an interconnecting segment or segment group within the volume of a formation to have thermal energy recovered therefrom.

In respect of the spatial orientation of the wells within a thermally productive formation, reference may be had to FIG. 2. In the illustration, elements have been removed for clarity, however it will be understood that the illustration is to convey the disposition of the interconnecting segment 16 may have relative to at least one of the plane of the inlet well 14 and outlet well 18.

In the Figure, the interconnecting well segment 16 may be positioned at any angle within any of the planes (X-Y), (X-(-Y)) ((X)-Y) ((-X)-(-Y)), (X-Z), (X-(-Z)), (Z-(-X)), ((X)-(-Z)), (Z-Y), (Z-(-Y)), ((-Z)-(-Y)) and ((-Z)-Y) and may also be disposed to have an X, Y and Z coordinate for cross plane disposition. For purposes of explanation the positive x axis will represent the inlet well 14. The well may be disposed at any angle alpha or beta in a range which does not impede operation of the well 14. This is equally true for outlet well 18. The inlet wells 14 and outlet wells 18 communicate with the surface, S, as referenced in respect of FIG. 1.

Any number of interconnecting segments 16 may be disposed within the space discussed. Other well configurations will be discussed in the advancing Figures. The quantity and spatial positioning will depend on the thermal gradient of the formation 12.

Advantageously, the observation of the drilling by intersection between the inlet well 14 and outlet well 16 by independent drilling operations to form the interconnecting segment 18, the absence of liners, casing, etc. within the interconnecting segment with conditioning of the drilling operation, results in configuration freedom to maximally recover thermal energy.

Figure 3:
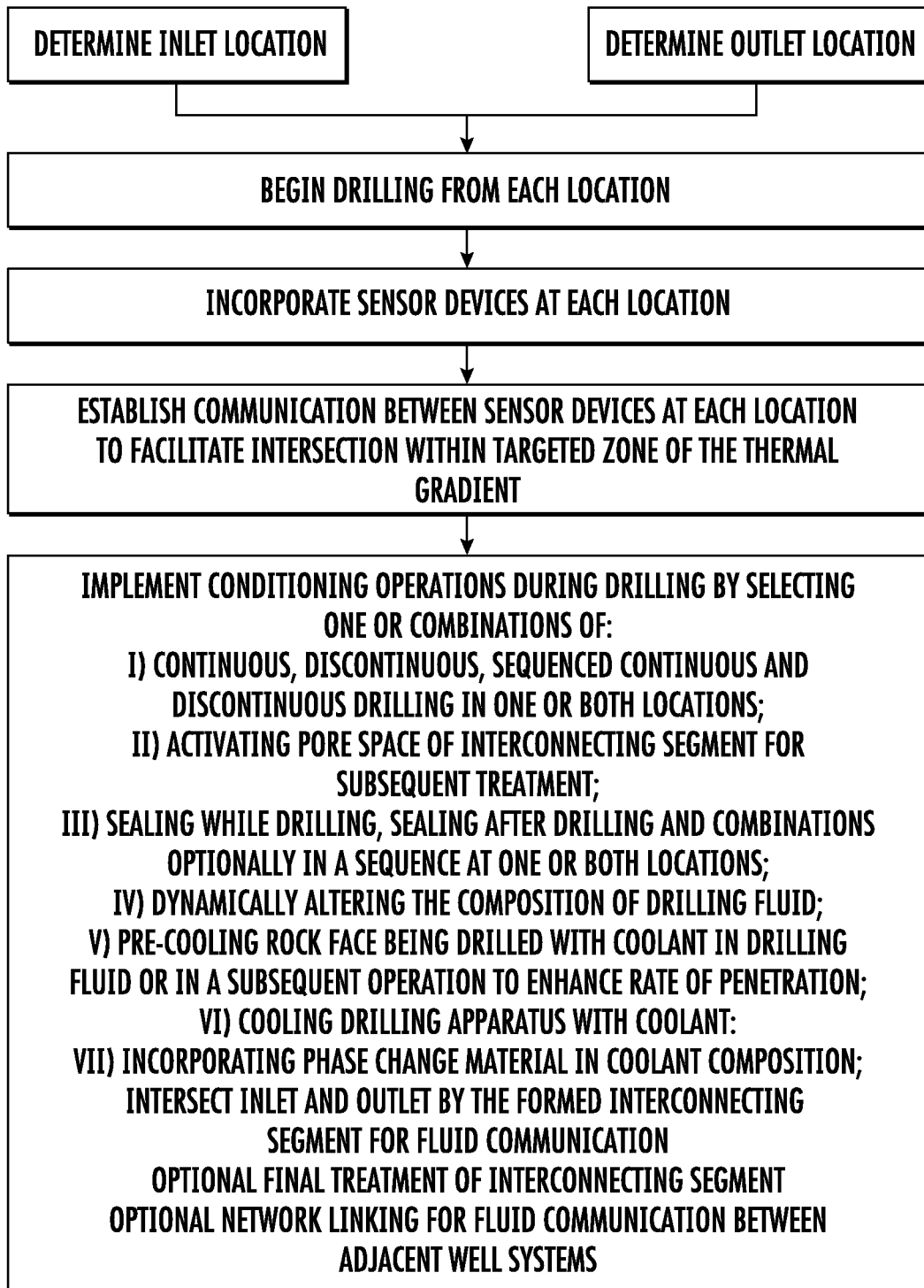
FIG. 3 is a flow chart delineating the steps involved in forming a wellbore configuration by drilling intersection of at least two points.

FIG. 3 illustrates an example of the steps involved in sensor ranging the inlet well and outlet well in a formation for intersection through the formed interconnecting segment. Although the example references an interconnecting segment, it will be understood that the methodology relates to multiple interconnecting segments formation in any pattern as discussed in respect of FIG. 2. The individual interconnecting segments are fully utilizable to have sensor communication there between to guide the drilling of subsequent interconnecting segments with a given well system or those being formed in a proximate system within the formation. By providing the cross communication between the wells, the inlets, the outlets and interconnecting segments, trajectory drift is minimized to facilitate accurate intersection of the wells being drilled. Sensors may also be utilized in the detritus capture segments 19, not shown and discussed in greater detail herein after.

Figure 4:
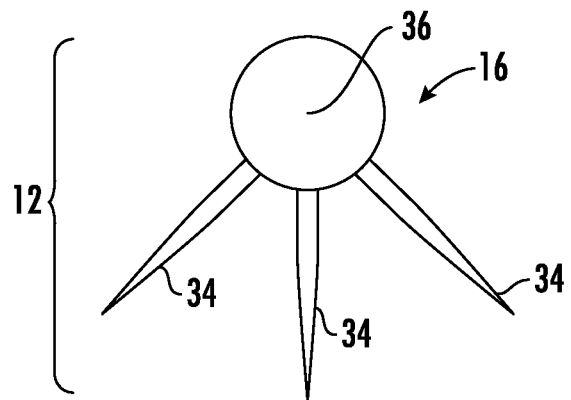
FIG. 4 is a cross section of a wellbore variation.

Referring now to FIG. 4, a cross section of an interconnecting segment 16 is shown disposed with formation 12. Extending from the segment 16 are or conduits 34 extending into the formation 12. Conduits 34 may be voids either in fluid communication with the interior 36 of segment 16 or sealed without fluid communication with the interior 36. It has been found that the conduits 34 are useful to enhance the thermal recovery capacity of the interconnecting segment when working fluid is circulated there though as well in periods of quiescence. Positioning and quantity of the radially extensions will be dictated by formation characteristics to maximize thermal recovery without structural/mechanical compromise of the segment 16. Where adequate, if preexisting fissures, cracks, fractures or contained areas of permeability are encountered, they may be used to function as conduits. Theses may also occur during drilling of the segment 16.

Figure 5:
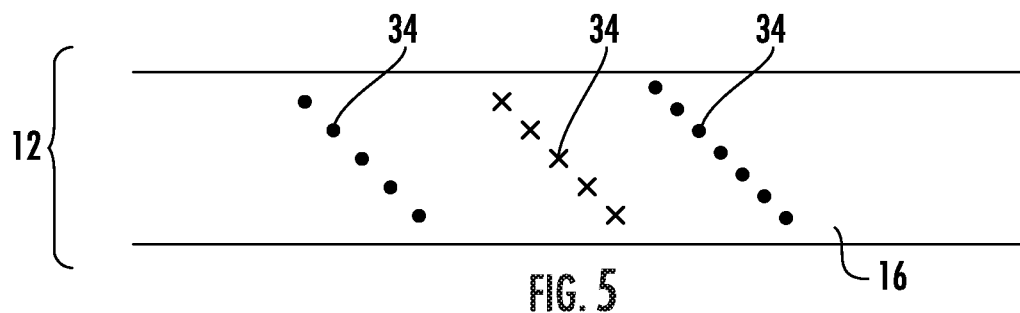
FIG. 5 is a side view of FIG. 4.

FIG. 5 illustrates an example where the conduits 34 are arranged in a generally helical pattern with the dotted points representing those extending outwardly from the plane and those crossed points being representative of the extensions on the opposed surface extending away from the plane. This is exemplary; the pattern will be ascertained from gradient data amongst other germane parameters.

Figure 6:
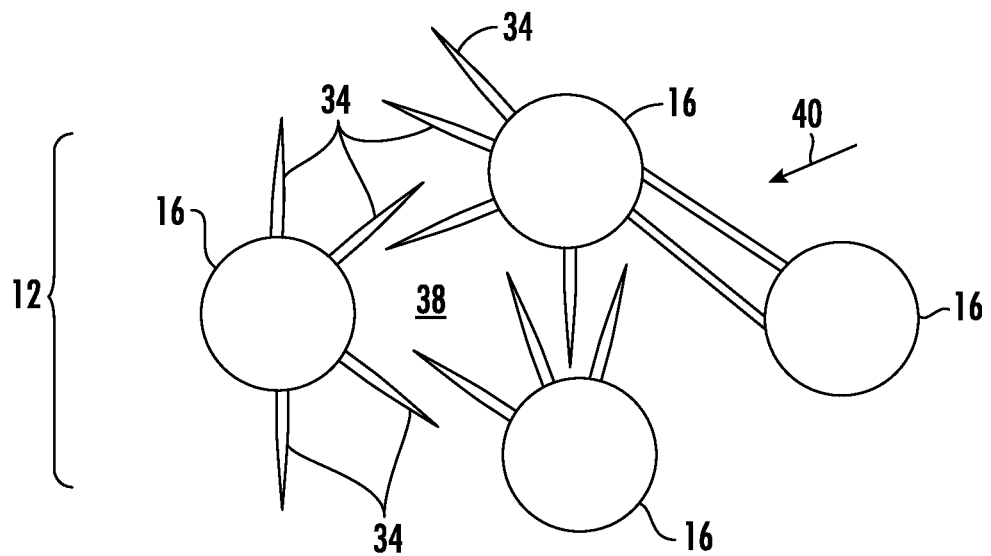
FIG. 6 is an alternate embodiment of FIG. 5.

FIG. 6 illustrates a further example where a plurality of segments 16 are disposed within formation 12. In the example, the extensions 34 of adjacent segments may be arranged in close proximity to fill a given area 38 with extensions to effectively increase the volume of the gradient from which thermal energy may be recovered. The conduits 34 act as a convection cell of buoyancy driven flow which direct thermal energy into the interior 34 of segments 16. The extensions can be arranged for adjacent positioning or interdigitated with other conduits 34.

As a further embodiment, the individual segments 16 may be connected by the conduits 34, the connection being generally denoted by numeral 40. In this manner, the arrangement has the appearance of a ladder when viewed perspectively.

Figure 7:
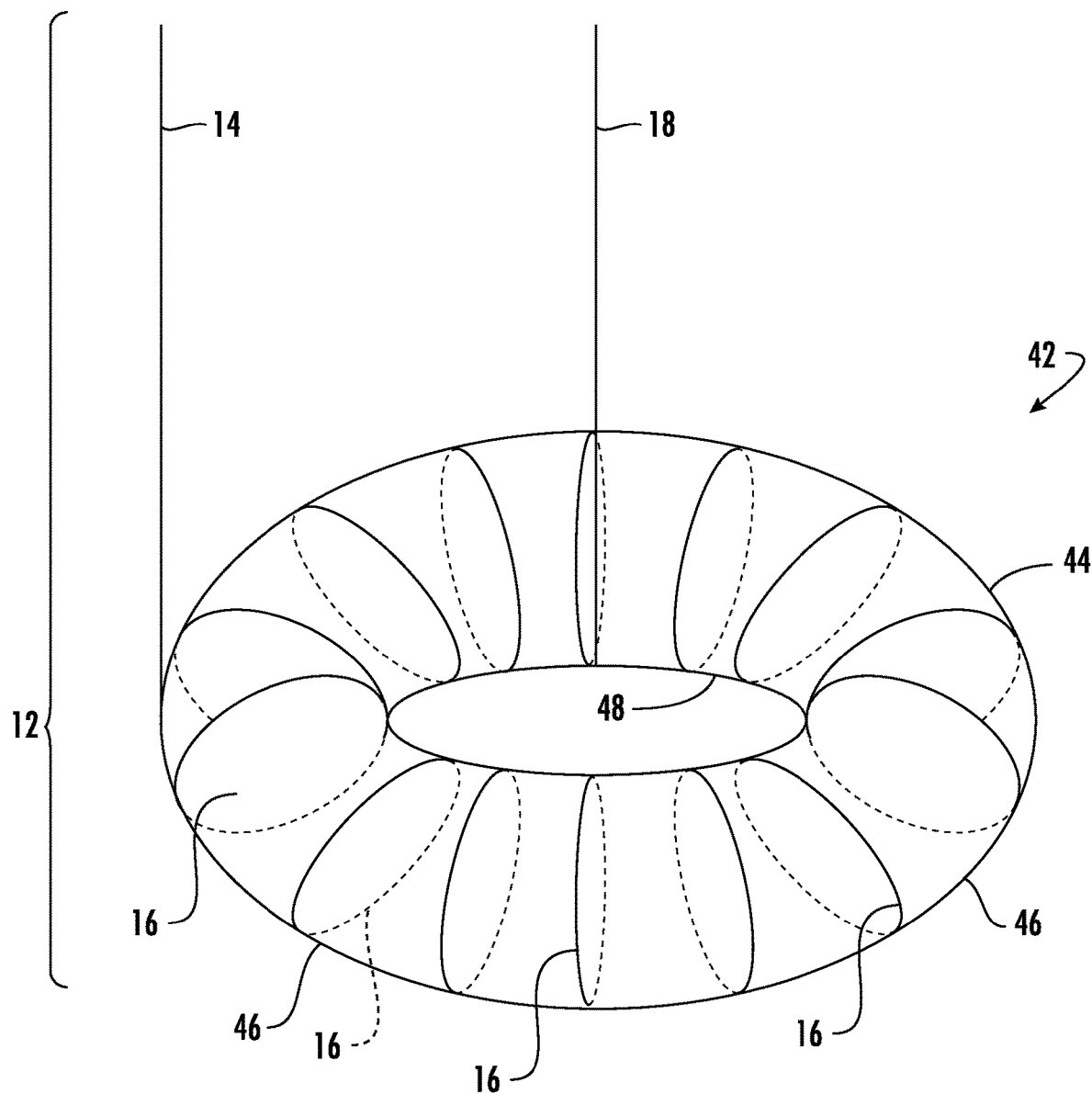
FIG. 7 is an embodiment of a wellbore configuration.

Turning now to the well configuration possibilities, FIG. 7 illustrates a generally toroidal well configuration generally denoted by numeral 42 disposed within formation 12.

In this arrangement, inlet well 14 is in fluid communication with a main inlet hub well 44 which is connected to each of the interconnecting segments 16. Suitable valve devices (not shown, but generally represented by numeral 46) may be incorporated in some or all of the looped segments 16 for fluid flow redirection and other control. The arrangement 42 also includes a main outlet hub well 48 connected in a similar manner as that indicated for main inlet hub well 46 with a similar valving feature (not shown).

Within the structure, each looped segment 16 may be operated as a single unit to recover thermal energy.

As an operational alternative, the flow of working fluid within arrangement 42 may be circulated in a generally helical pattern through the whole arrangement with sequencing of periods of quiescence to allow for maximum thermal recovery. Such flexibility allows for connection to, for example the energy processing device 20. This facilitates on demand power when the energy is converted to electricity and overcomes the limitations associated with baseload power peak delivery issues.

Figure 8:
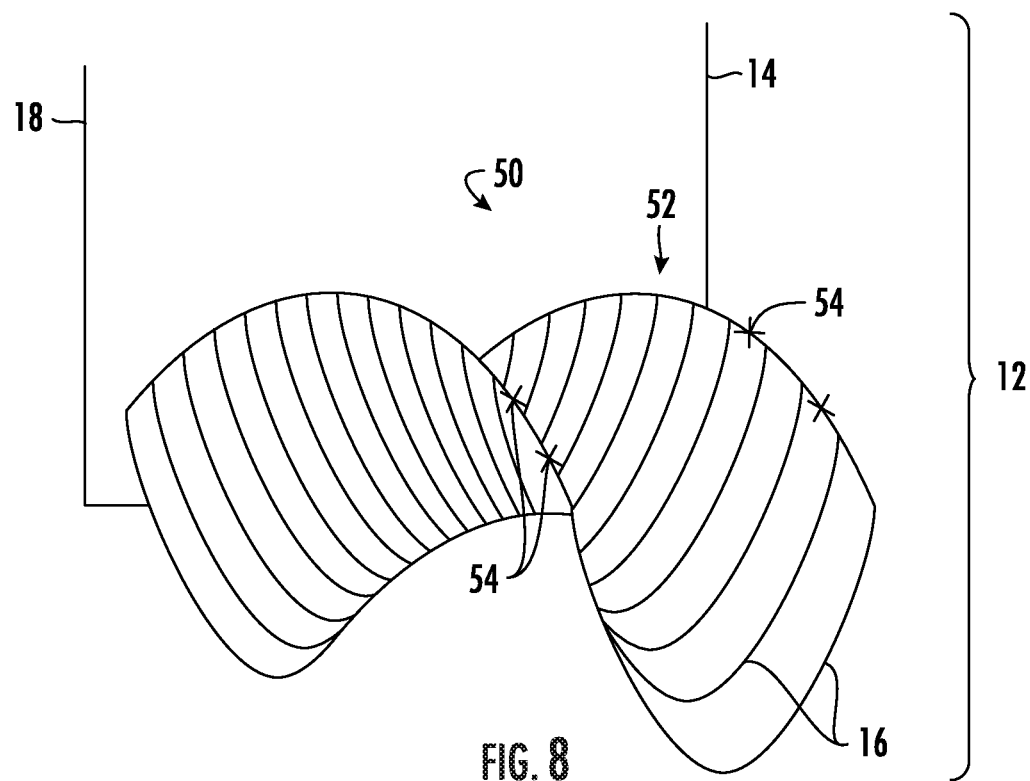
FIG. 8 is an alternate embodiment of a wellbore configuration.

FIG. 8 illustrates a further embodiment of a well configuration denoted by numeral 50. The general shape is that of a saddle where the interconnecting looped segments are adjacent one another with an arcuate presentation. The inlet well 14 may be connected to each of the looped segments 16 in a hub or manifold arrangement 52 or valved at 54 for selective operation. In a similar manner, outlet 18 may connected in the same fashion.

Figure 9:
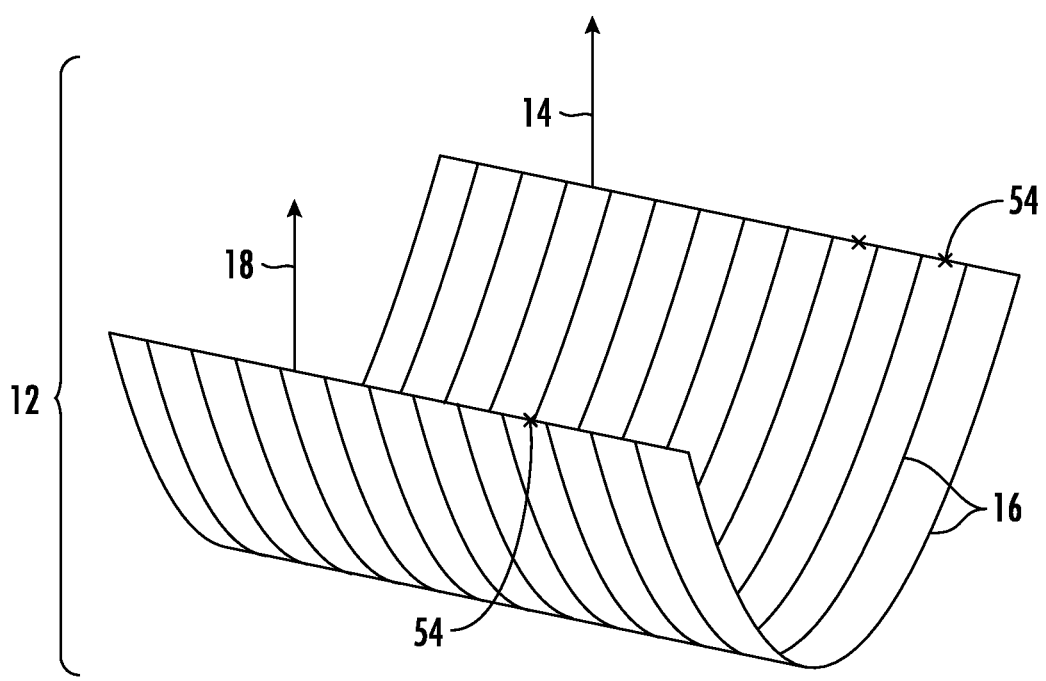
FIG. 9 is a further alternate embodiment of a wellbore configuration.

FIG. 9 illustrates yet another possible variation generally in the form of an inverted parabola.

FIG. 10 illustrates another well system configuration where the inlets 14 may be singular from distant points in the configuration or joined at 56. Similarly, outlets 18 may be combined at 58. For colocation, the outlets 58 and inlets 56 may be extended for geographic proximity.

FIG. 11 illustrates a general cone shaped configuration where the outlet well 18 may be at the bottom portion of the configuration or the top as shown in dashed line. The lower parts of the looped segments 16 may be connected together or independent.

Figure 12:
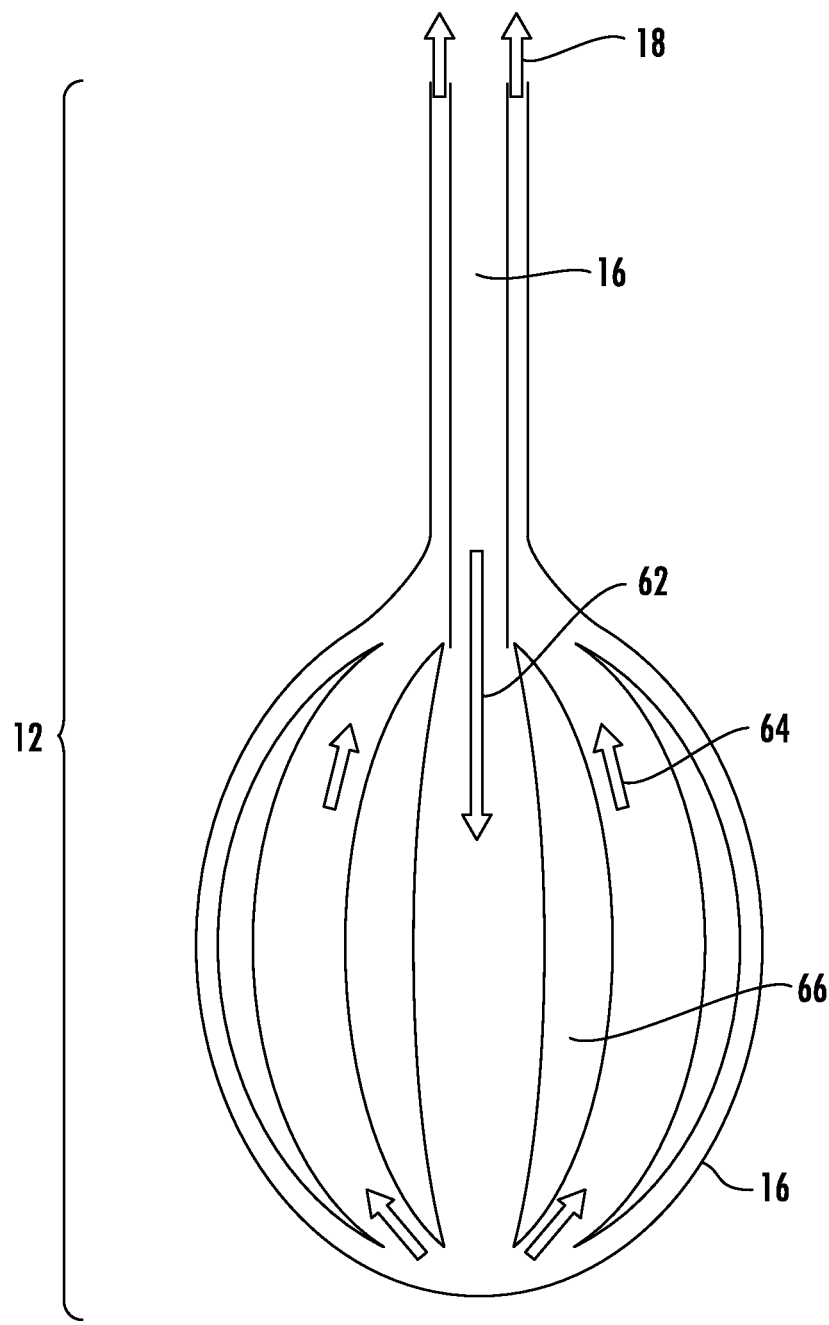
FIG. 12 is a further alternate embodiment of a wellbore configuration.

FIG. 12 illustrates yet another configuration in the general form of a whisk. In this embodiment, the segment loops 16 may have a concentric inlet 14 and outlet 18 with fluid flow from the inlet in the direction of arrow 62 and outlet flow at 64. This arrangement allows for a large volume of the formation to be "mined" for heat in the formation 12 outside of the configuration and in the formation volume 66 within the configuration. One of the advantages with this configuration are that all of the intersections happen with a single borehole or "mother bore" and electromagnetic signalling can be simplified, even accomplished with permanent devices placed in the mother bore or passively. Another advantage is only a single vertical bore is required to house both the inlet and outlet flow streams.

Figure 13:
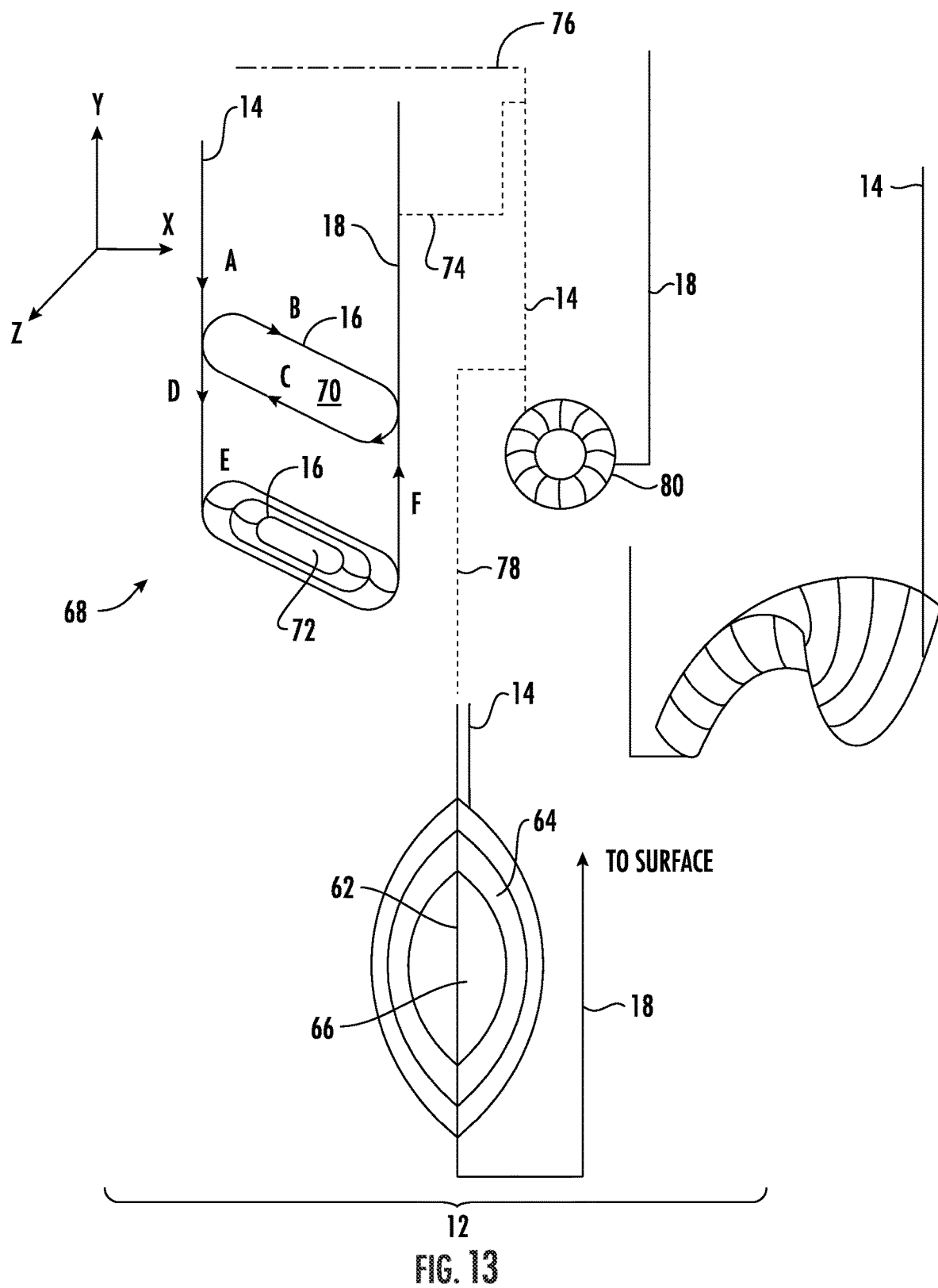
FIG. 13 is a schematic illustration of a system of wellbore configurations within a formation.

Turning to FIG. 13, a wellbore system sector is schematically depicted generally denoted by numeral 68. Sector 68 is within a thermally productive formation 12, with the positioning of different wellbore configurations positioned in predetermined zones to maximize gradient coverage. In the example, the sector 68 provides a stacked and spaced arrangement of looped segments 16 sharing a common inlet well 14 and common outlet well 18.

Depending on the parameters, fluid circulation may follow the pattern denoted A through F. In this manner, at least a portion of heated fluid from top looped segments 70 may preheat the fluid entering bottom looped segments 72. Alternatively, each of the looped segments 70 and 72 can be operated independently.

In respect of the remaining configurations, the toroidal configuration 80 may receive heated fluid from the outlet 18 of the stacked arrangement 70, 72 as denoted by the dashed lines 74 or simply have an independent inlet well 14 denoted by the chain line 76.

The whisk configuration, may have an independent inlet well 14 and a bottom positioned outlet well 18 or the inlet well may be common with that of the toroidal configuration as denoted by numeral 78.

Finally, the saddle configuration may include a common outlet well with the toroidal configuration at 80.

It will be understood that all inlet wells 14 and outlet wells 18 will extend to the surface or conversion device 20 (FIG. 1) for operation. In the FIG. 13, the wells 14, 18 are truncated for purposes of clarity in the illustration.

The sector 68 is exemplary only as are the wellbore configurations and common and independent combinations. With the intersecting directional drilling, the conditioning operations and sensor guided drilling, any pattern or configuration can be synthesized to exploit even the most irregular, disparate multizonal gradient distributions. All of these features when unified with the fact that the instant technology does not include piping liners or other mechanical arrangements within the heat recovering interconnecting segments, immediately removes geometric constraints for the configurations thus allowing the mining of any gradient in any rock formation.

Figure 14:
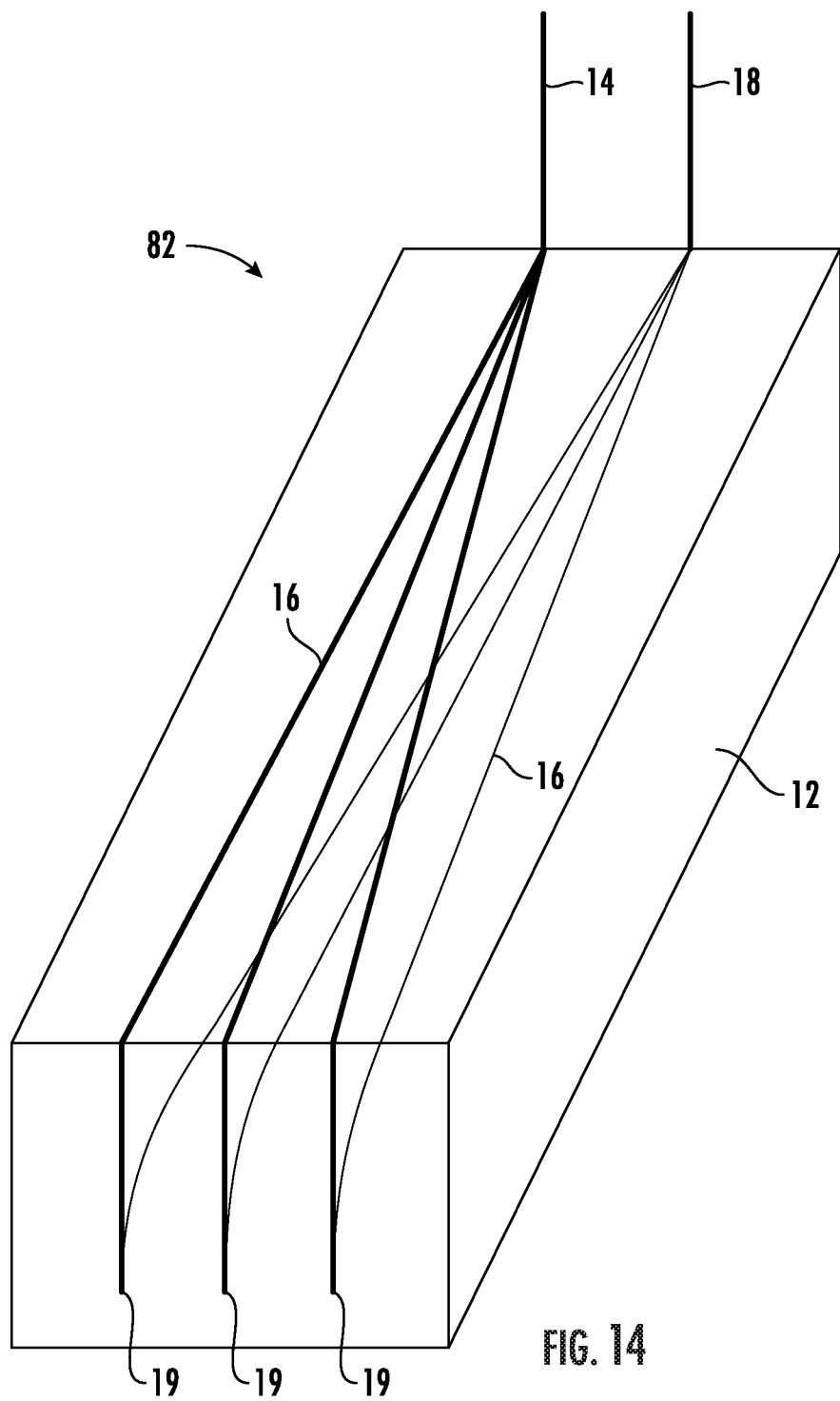
FIG. 14 is a schematic illustration of a network of sectored wellbore configurations.

FIG. 14 is another example of a well arrangement 82 to recover thermal energy from a specific volume of the formation 12. In the example, the detritus segments 19 may include sensors 84 to transmit information regarding detritus accretion. In this manner, the working fluid may be compositionally altered to incorporate chemical additives to mitigate/repair any compromised areas with the well system. The arrangement of the interconnecting segments 16 may disposed in a spaced array as shown to recover thermal energy.

Figure 15:
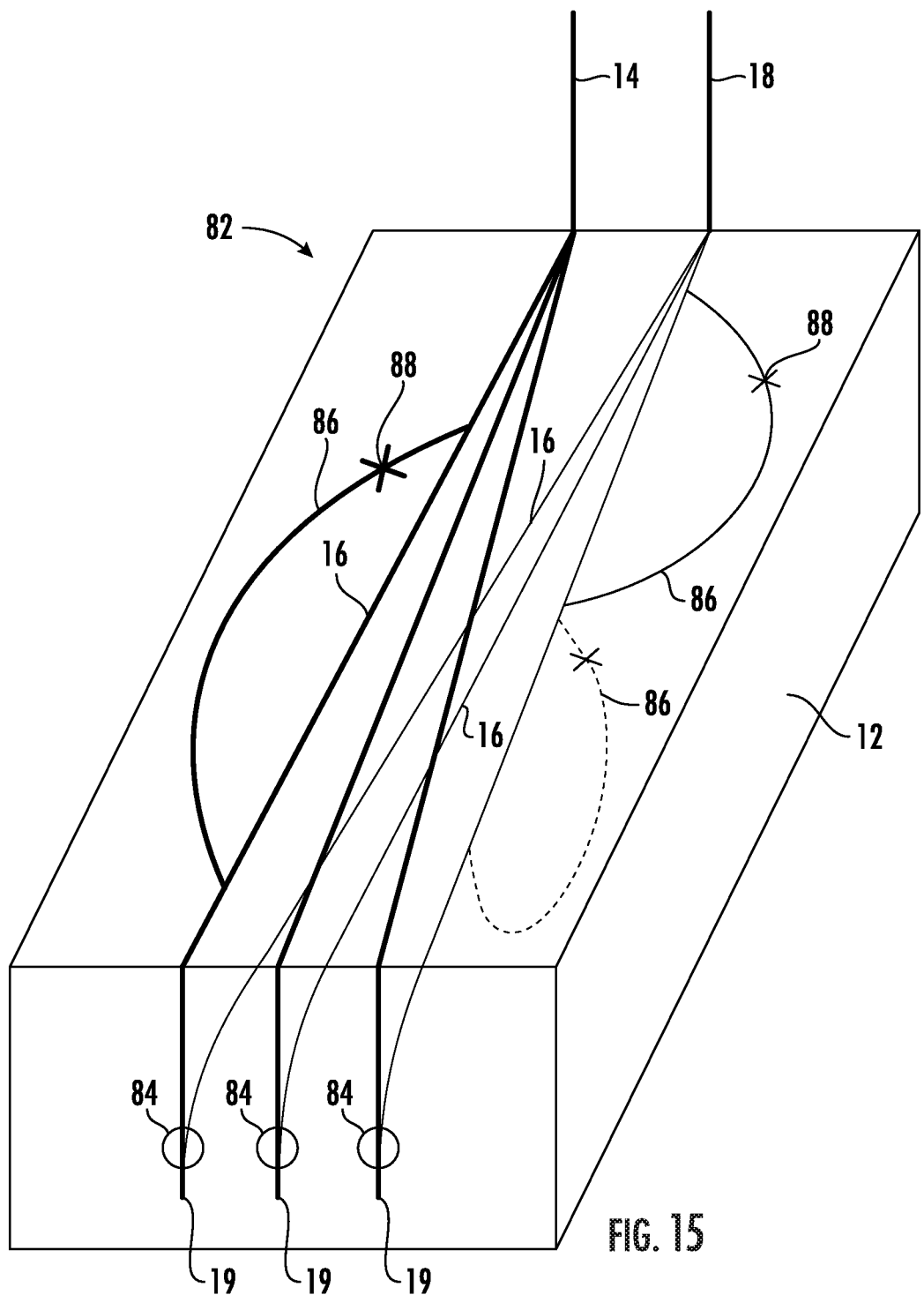
FIG. 15 is a schematic illustration of a wells system illustrating the detritus segments.

Further, as illustrated in FIG. 15 auxiliary segments 86 may be in fluid communication with a respective segment 16 to which it is attached and incorporate a valve mechanism 88 to allow for selective operation. The auxiliary segments 88 may be used to store heated working fluid selectively used as a thermal driver in the arrangement for the well system in the example or used via suitable interconnection to another well system (not shown in this Figure). As illustrated, the auxiliary segments 86 may be positioned in a coplanar disposition with the segment to which it is attached or in an orthogonal plane as shown in dashed lines in the Figure. Suitable variations to this are envisioned depending on the gradient features.

Figure 16:
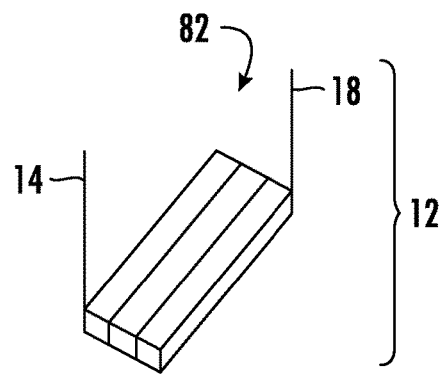
FIG. 16 is a schematic illustration of stacked wells in a modular format.
Figure 16A:
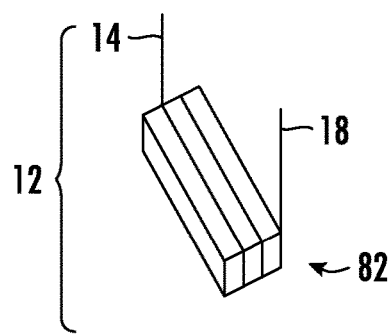
FIG. 16A is an alternate embodiment of FIG. 16.

FIGS. 16 and 16A illustrate grouped well systems 82 in different angular dispositions within the formation. In the grouped configurations, the systems 82 are modularized within a specific volume of the formation 12 thus allowing for a small footprint and convenient general co-location of the inlet well 14 and outlet well 18. Within the module, inlet wells 14 and outlet wells may be common to individual well systems or common for all modules in the system 82.

Figure 17:
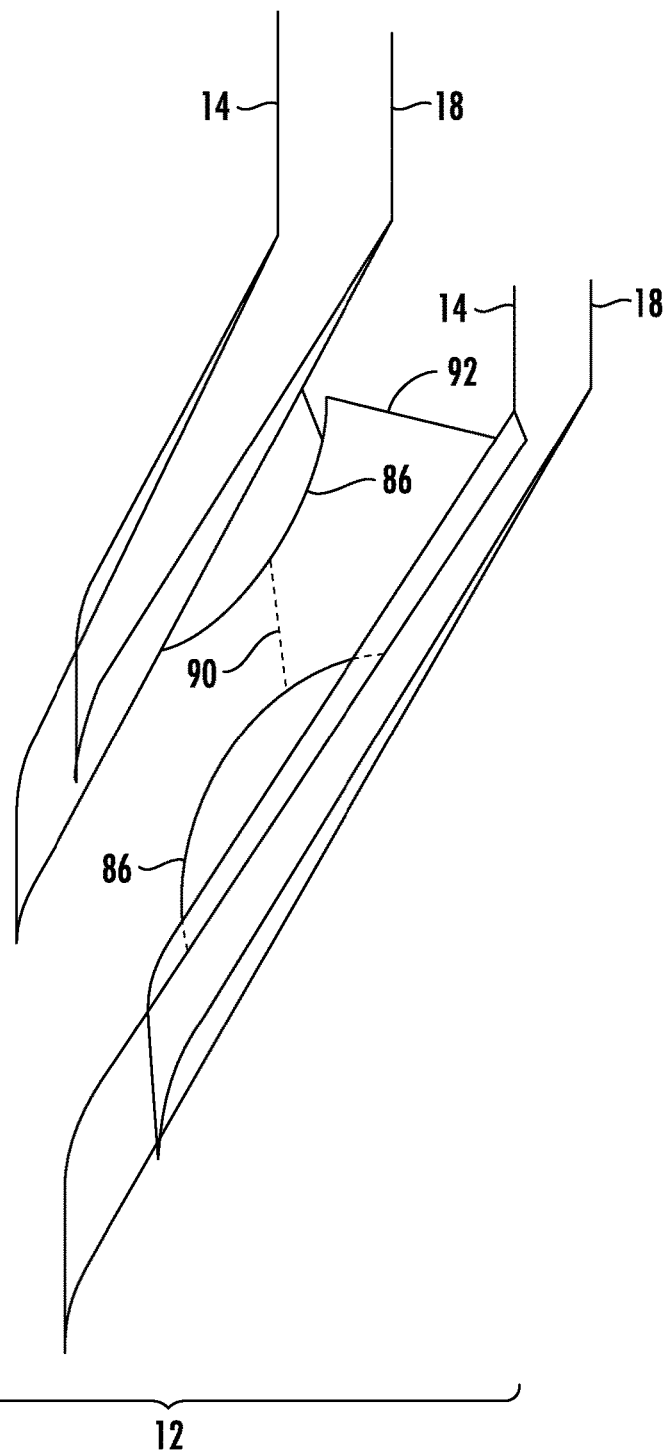
FIG. 17 is a schematic illustration of a well system where there is interconnection between auxiliary segments.

FIG. 17 provides for the possibility of interconnecting auxiliary segments 86 between adjacent wells at 90 or thermal supplementation from one outlet 18 to an inlet 14 of an adjacent well.

Figure 18:
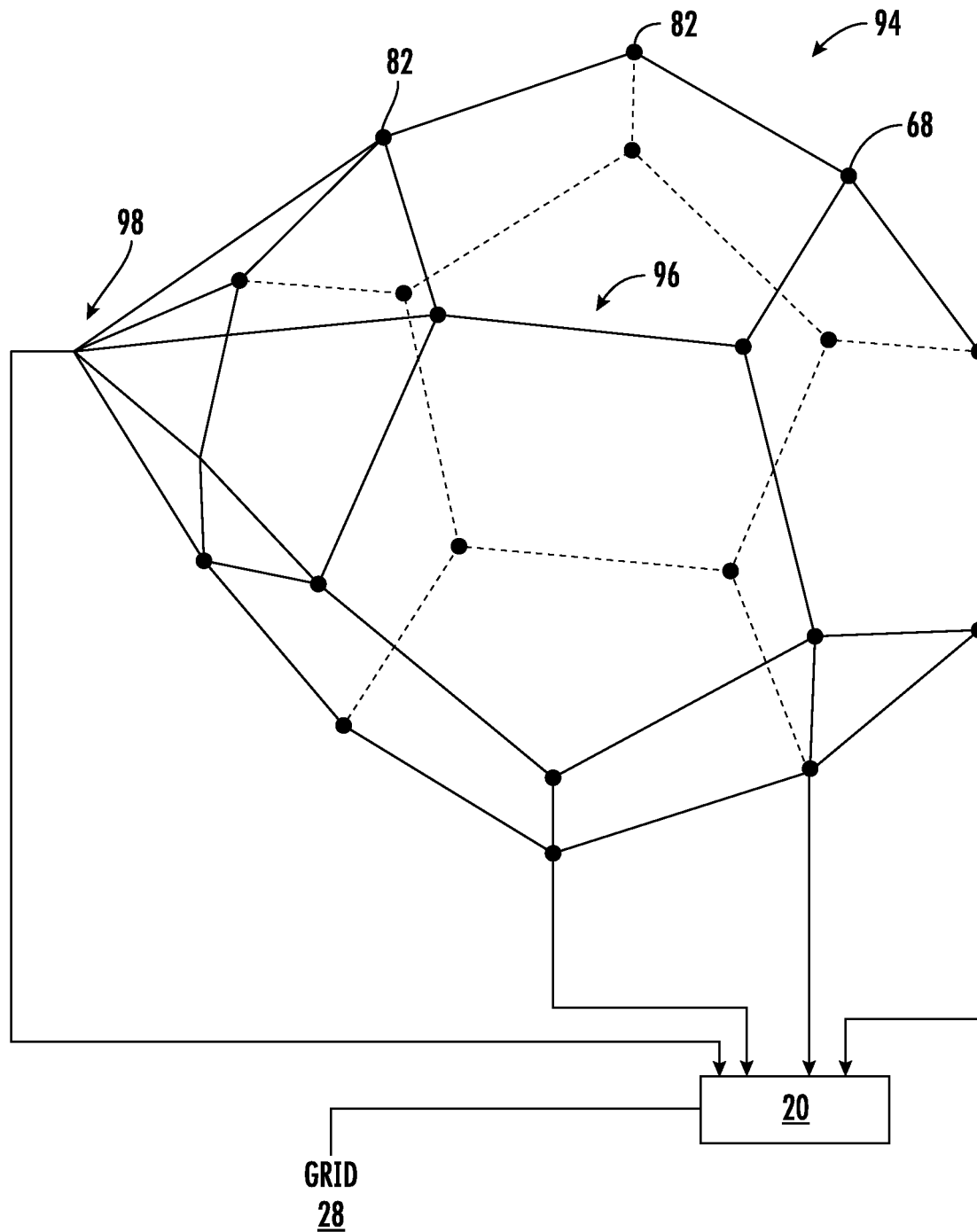
FIG. 18 is a schematic illustration of a network of well systems integrated with an electrical grid.

In FIG. 18 a network is depicted and intended to convey the feature that the energy produced within any well system 82 can be taken directly for other uses through the energy producing apparatus 20 associated with that system 82, combined from one system 82 to another 82 as denoted by numeral 96 or further grouped as denoted by numeral 98 for eventual use on the electrical grid 28 to provide on demand power regardless of quantitative demand.

The invention claimed is:

1. A closed-loop geothermal well system for geothermal heat recovery from a subterranean geothermal zone, comprising:
    an inlet wellbore extending from the terranean surface to the geothermal zone;
    an outlet wellbore extending from the terranean surface to the geothermal zone;
    a first open hole lateral wellbore extending out from the inlet wellbore and sloping downward into the geothermal zone; and
    a second open hole lateral wellbore extending out from the outlet wellbore and sloping downward into the geothermal zone at a different depth than the first lateral wellbore, a downhole end of the first lateral wellbore coupled to a downhole end of the second lateral wellbore at a junction, the junction being at a greater depth than a downhole end of the inlet wellbore and a downhole end of the outlet wellbore, to allow fluid to circulate from the inlet wellbore to the first lateral wellbore, from the first lateral wellbore to the second lateral wellbore and from the second lateral wellbore to the outlet wellbore.

2. The closed-loop geothermal well of claim 1, where the inlet wellbore and the outlet wellbore are co-located at the terranean surface.

3. The closed-loop geothermal well of claim 1, comprising:
    casing in the inlet wellbore; and
    casing in the outlet wellbore.

4. The closed-loop geothermal well of claim 3, where the rock around the first and the second lateral wellbores is sealed.

5. The closed-loop geothermal well of claim 1, comprising a plurality of first open hole lateral wellbores extending out from the inlet wellbore and sloping downward into the geothermal zone and a plurality of second open hole lateral wellbores extending out from the outlet wellbore and sloping downward into the geothermal zone, and where respective pairs of first and second lateral wellbores are coupled to each other at respective junctions, each of the respective junctions being at a greater depth than a downhole end of the inlet wellbore and a downhole end of the outlet wellbore.

6. The closed-loop geothermal well of claim 5, where the inlet wellbore and the outlet wellbore are co-located at the terranean surface.

7. The closed-loop geothermal well of claim 1, where an intersection of the first lateral wellbore with the second lateral wellbore defines a detritus capture segment.

8. The closed-loop geothermal well of claim 1, comprising a sloped wellbore segment where the first and second lateral wellbores couple, the sloped wellbore segment inclined more steeply than the remainder of the wellbore having the sloped wellbore segment.

9. The closed-loop geothermal well of claim 1, where the inlet wellbore and the outlet wellbore reside at a surface site; and
    comprising:
        a second inlet wellbore extending from the terranean surface to the geothermal zone and residing at the surface site;
        a second outlet wellbore extending from the terranean surface to the geothermal zone and residing at the surface site;
        a third open hole lateral wellbore extending out from the second inlet wellbore into the geothermal zone; and
        a fourth open hole lateral wellbore extending out from the second outlet wellbore into the geothermal zone at a different depth than the third lateral wellbore, wherein ends of the third and fourth lateral wellbores are coupled, opposite the second inlet and second outlet wellbores, to allow fluid to circulate from the second inlet wellbore to the third lateral wellbore, from the third lateral wellbore to the fourth lateral wellbore and from the fourth lateral wellbore to the second outlet wellbore.

10. A method for forming a closed-loop geothermal well in a subterranean geothermal zone, comprising:
    drilling a first open hole lateral wellbore extending out from an inlet wellbore and sloping downward into the geothermal zone, the inlet wellbore extending from the terranean surface; and
    drilling, at a different depth than the first lateral wellbore, a second open hole lateral wellbore extending out from an outlet wellbore and sloping downward into the geothermal zone to intersect the first lateral wellbore at a junction, the junction being at a greater depth than a downhole end of the inlet wellbore and a downhole end of the outlet wellbore, to allow fluid to circulate from the inlet wellbore to the first lateral wellbore, from the first lateral wellbore to the second lateral wellbore, and from the second lateral wellbore to the outlet wellbore, the outlet wellbore extending from the terranean surface.

11. The method of claim 10, comprising:
    drilling and casing the inlet wellbore;
    drilling and casing the outlet wellbore; and
    leaving the first lateral wellbore and the second lateral wellbore open hole.

12. The method of claim 11, comprising sealing the rock surrounding first lateral wellbore and the second lateral wellbore.

13. The method of claim 12, comprising circulating a heat transfer working fluid in the wellbores while maintaining the first lateral wellbore and the second lateral wellbore sealed.

14. The method of claim 12, comprising:
    drilling a plurality of first open hole lateral wellbores from the inlet wellbore into the geothermal zone; and
    drilling a plurality of second open hole lateral wellbores from the outlet wellbore into the geothermal zone to each couple to a respective one of the first open hole lateral wellbores.

15. The method of claim 14, comprising:
    sealing the plurality of first and second wellbores; and
    circulating a heat transfer working fluid while maintaining the first and second wellbores sealed.

16. The method of claim 10, where drilling the first open hole lateral wellbore and drilling the second open hole lateral wellbore comprise drilling the lateral wellbores to intersect.

17. The method of claim 10, comprising drilling a sloped wellbore segment where the first and second lateral wellbores couple, the sloped wellbore segment inclined more steeply than the remainder of the wellbore having the sloped wellbore segment.

18. The method of claim 10, comprising:
drilling the inlet wellbore at a surface site;
drilling the outlet wellbore at the surface site;
drilling a second inlet wellbore at the surface site;
drilling a second outlet wellbore at the surface site;
drilling a third open hole lateral wellbore from the second inlet wellbore into the geothermal zone; and
drilling, at a different depth than the third lateral wellbore, a fourth open hole lateral wellbore from the second outlet wellbore into the geothermal zone to the third lateral wellbore to allow fluid to circulate from the second inlet wellbore to the third lateral wellbore, from the third lateral wellbore to the fourth lateral wellbore, and from the fourth lateral wellbore to the second outlet wellbore.

* * * * *